S. G. CRAWFORD & B. C. JACKSON.
Band-Saw Mills.
No. 217,514. Patented July 15, 1879.
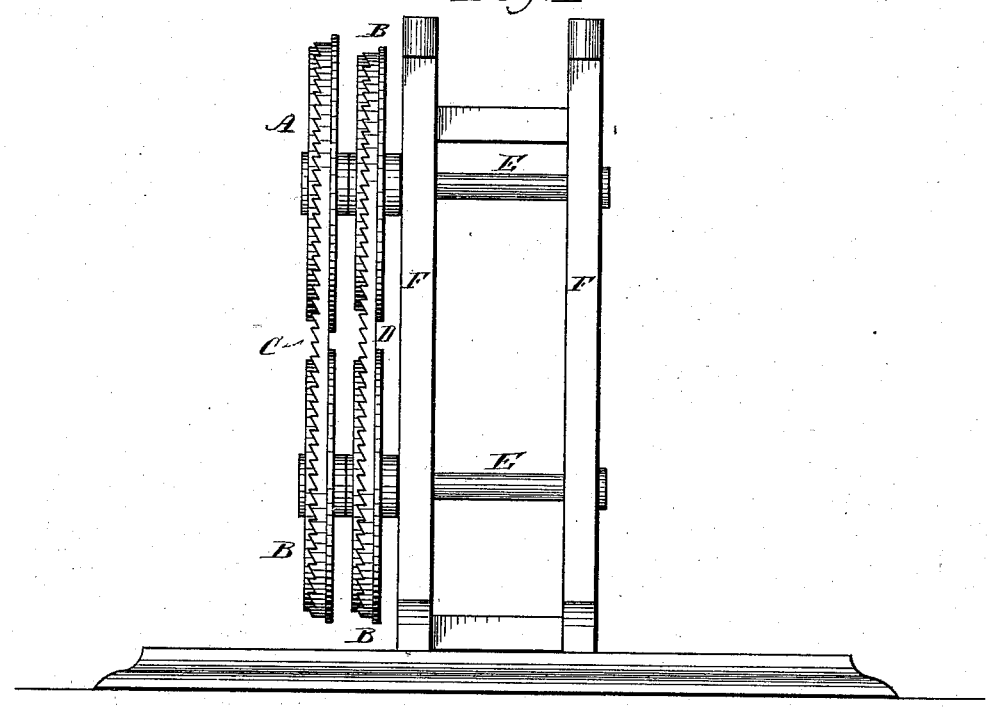
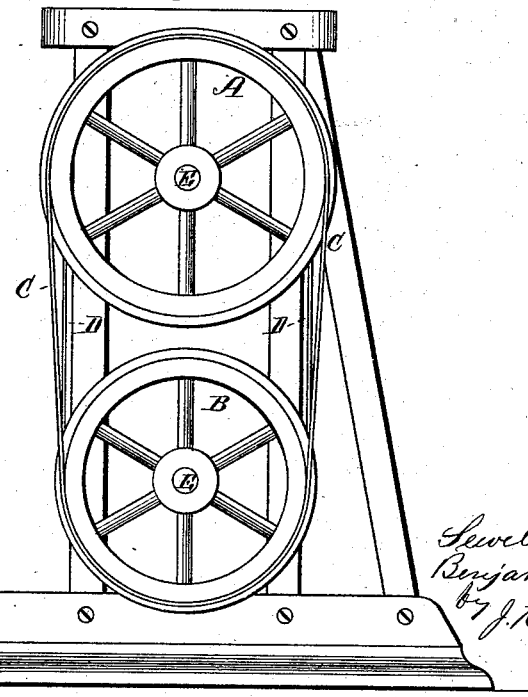

UNITED STATES PATENT OFFICE.

SEWELL G. CRAWFORD AND BENJAMIN C. JACKSON, OF OAKLAND, CAL.

IMPROVEMENT IN BAND-SAW MILLS.

Specification forming part of Letters Patent No. 217,514, dated July 15, 1879; application filed April 29, 1879.

*To all whom it may concern:*

Be it known that we, SEWELL G. CRAWFORD and BENJAMIN C. JACKSON, residing in Oakland, in the county of Alameda and State of California, have jointly invented certain new and useful Improvements in Band-Saw Mills, of which the following is a specification, reference being had to the accompanying drawings and the letters marked thereon.

The nature of our invention consists in the arrangement of machinery for the cutting of shingles with the grain of the wood by means of band-saws so adjusted as to give the necessary bevel or wedge shape to the shingle.

The objects are twofold—first, to save timber by using a thin saw, and consequently cutting a narrow kerf; secondly, cutting lengthwise of the shingle, the lines made by the teeth of the saw giving direction to the water to prevent it from running off the edge of the shingle, thereby preventing the liability to leakage of roof, so common where the circular saw is used in cutting the shingle and the saw-kerf.

Our invention will be more clearly understood by reference to Figure 1, a side elevation, and Fig. 2, a front elevation.

F represents the frame; E, the shafts; A and B, the pulleys or saw-wheels; C and D, the saws.

The pulley A is increased in diameter above that of the pulleys B, which are all three of the same diameter.

The object of making the pulley A larger than the others will be readily seen by reference to Fig. 2, which shows the wedge-shaped space between the saws at C and D. These saws take off two shingles at each motion of the block as it is fed past them by any suitable feed which will feed the block the thickness of the butt and point and the two saw-kerfs.

The advantages of our invention may be clearly seen in the fact that at least one-fifth more shingles can be made out of the same amount of timber that a circular saw would require, on account of the saving in the kerf; and the further and no less important advantage is seen in the superior quality of the shingle for painted roofs, as it is as readily painted as planed or surfaced lumber; also, the water running freely down off the end of the shingle allows it to dry quickly, thus rendering it far less liable to rot.

What we claim, and desire to secure by Letters Patent, is—

A machine for sawing shingles, consisting of the pulleys B B B, keyed or otherwise secured to suitable shafts arranged one above the other, and the pulley A, of greater diameter than the pulleys B, in combination with the band-saws C D, substantially as and for the purpose set forth.

SEWELL G. CRAWFORD.
BENJAMIN C. JACKSON.

Witnesses:
JOHN H. REDSTONE,
FRANK R. BRANN.